(12) United States Patent
Alade et al.

(10) Patent No.: US 7,805,924 B2
(45) Date of Patent: Oct. 5, 2010

(54) THERMALLY DECOUPLED MIXER

(75) Inventors: Adeyemi E. Alade, East Hartford, CT (US); Paul W. Palmer, Vernon, CT (US)

(73) Assignee: United Technologies Corporation, Hartford, CT (US)

(*) Notice: Subject to any disclaimer, the term of this patent is extended or adjusted under 35 U.S.C. 154(b) by 978 days.

(21) Appl. No.: 11/606,833

(22) Filed: Nov. 30, 2006

(65) Prior Publication Data
US 2008/0131276 A1 Jun. 5, 2008

(51) Int. Cl.
F02K 1/38 (2006.01)
F02K 1/46 (2006.01)
F02K 3/02 (2006.01)

(52) U.S. Cl. .......................... 60/262; 60/263; 60/226.3; 239/265.11; 239/265.17; 415/134; 415/135; 415/136; 415/137; 415/138; 415/139; 415/211.2

(58) Field of Classification Search .................. 60/770, 60/39.5, 759, 262, 796, 798, 799, 263, 226.3; 248/200; 239/265.17, 265.11; 415/134–139, 415/211.2
See application file for complete search history.

(56) References Cited

U.S. PATENT DOCUMENTS 5,666,802 A * 9/1997 Lair .......................... 60/226.2
7,340,883 B2 * 3/2008 Wood et al. ................. 60/226.1
2003/0126856 A1 * 7/2003 Lair .............................. 60/262

* cited by examiner

*Primary Examiner*—Michael Cuff
*Assistant Examiner*—Craig Kim
(74) *Attorney, Agent, or Firm*—Carlson, Gaskey & Olds

(57) ABSTRACT

The present invention provides a mixer assembly including a mixer and a plurality of scoops attached around a circumference of the mixer element via a combination of sliding brackets and fixed brackets. The sliding brackets provide attachment and allow relative movement between the plurality of scoops and the mixer element while the fixed brackets provide only attachment between the mixer element and the plurality of scoops. The first sliding bracket includes a first flange that is fixedly mounted to the mixer element and a second flange that is biased against a surface of the scoop. A second sliding bracket is fixedly mounted to the mixer element and adjustably mounted to the scoop. The second sliding bracket includes an attachment hole and the scoop includes an adjustment slot. A fastener assembly including a spacer is received within the adjustment hole and the adjustment slot to allow relative movement between the mixer element and the scoop.

20 Claims, 6 Drawing Sheets

THERMALLY DECOUPLED MIXER

BACKGROUND OF THE INVENTION

This application relates generally to a mixer for a gas turbine engine wherein the mixer includes a scoop that is thermally decoupled from the mixer.

Conventional gas turbine engines include an intake section, a compressor, a combustor, a turbine assembly, and a tail section. The intake section includes a fan, which delivers intake air to both the compressor and a mixer located at the tail section.

Intake air enters the engine through the intake section. The intake air delivered to the compressor is compressed and delivered primarily to the combustor where the compressed air and fuel are mixed and burned in a constant pressure process. The by-products of the combustion process exit the engine through the tail section at an elevated temperature as exhaust.

The intake air, which is delivered to the mixer by the fan through a series of scoops attached to the mixer, is at a lower temperature than the exhaust. The lower temperature intake air mixes with the exhaust to reduce the temperature of the exhaust.

Traditionally, each scoop is fixedly attached to the mixer via an elaborate series of brackets, which are riveted to both the mixer and the scoop. As such, the traditional bracket/rivet attachment configuration is extensive, adding weight and, in turn, cost to the final engine assembly.

In addition, the traditional bracket/rivet attachment configuration is very rigid. Because the mixer receives exhaust at an elevated temperature and the scoops receive intake air at a much lower temperature, the mixer itself has the tendency to expand and contract to a greater degree than the scoops. As such, a thermal fight exists between the mixer and the scoop resulting in low cycle fatigue and high cycle fatigue cracking.

SUMMARY OF THE INVENTION

The present invention provides a mixer assembly for a gas turbine engine including a plurality of scoops attached to a circumference of a mixer element, wherein at least one end of each scoop is thermally decoupled from the mixer element. The scoop is both fixedly attached to the mixer element and moveable in relation to the mixer element to accommodate thermal expansion and contraction of the mixer element in relation to the scoop.

The thermally decoupled scoop is attached via at least one fixed bracket fixedly mounted to the mixer element and fixedly mounted to the scoop, at least one first sliding bracket fixedly mounted to the mixer element and moveable in relation to the scoop, and at least one second sliding bracket fixedly mounted to the mixer element and adjustably mounted to the scoop. The fixed bracket is fixedly mounted to an outer circumference of the mixer element and fixedly mounted to the scoop both by traditional means, for example by rivets.

The first sliding bracket includes a first flange that is fixedly attached to the circumference of the mixer element. The first flange extends inward from an inner surface of the scoop and is fixedly attached to the mixer element by traditional means, for example by rivets. The first sliding bracket further includes a second flange that is moveable in relation to the inner surface of the scoop. In the illustrated example embodiment, the second flange is a resilient member that is biased against the inner surface of the scoop by a spring force.

The second sliding bracket includes a first flange that is fixedly attached to the circumference of the mixer element by traditional means, for example by rivets. In the illustrated example embodiment, the second sliding bracket further includes a second flange that is adjustably mounted to the scoop. The second flange includes at least one attachment hole for receiving a spacer and a fastener assembly. The scoop, which includes at least one slot, is sandwiched between two second sliding brackets such that the at least one attachment hole of each of the second sliding brackets and the at least one slot of the scoop are in communication with one another. The spacer and fastener assembly are received within the attachment holes and the slot such that the scoop is moveable within the two sandwiched second sliding brackets to allow movement of the mixer element in relation to the scoop, effectively thermally decoupling the mixer element from the scoop during engine operation.

These and other features of the present invention can be best understood from the following specification and drawings, the following of which is a brief description.

DETAILED DESCRIPTION OF THE PREFERRED EMBODIMENT

Figure 1:
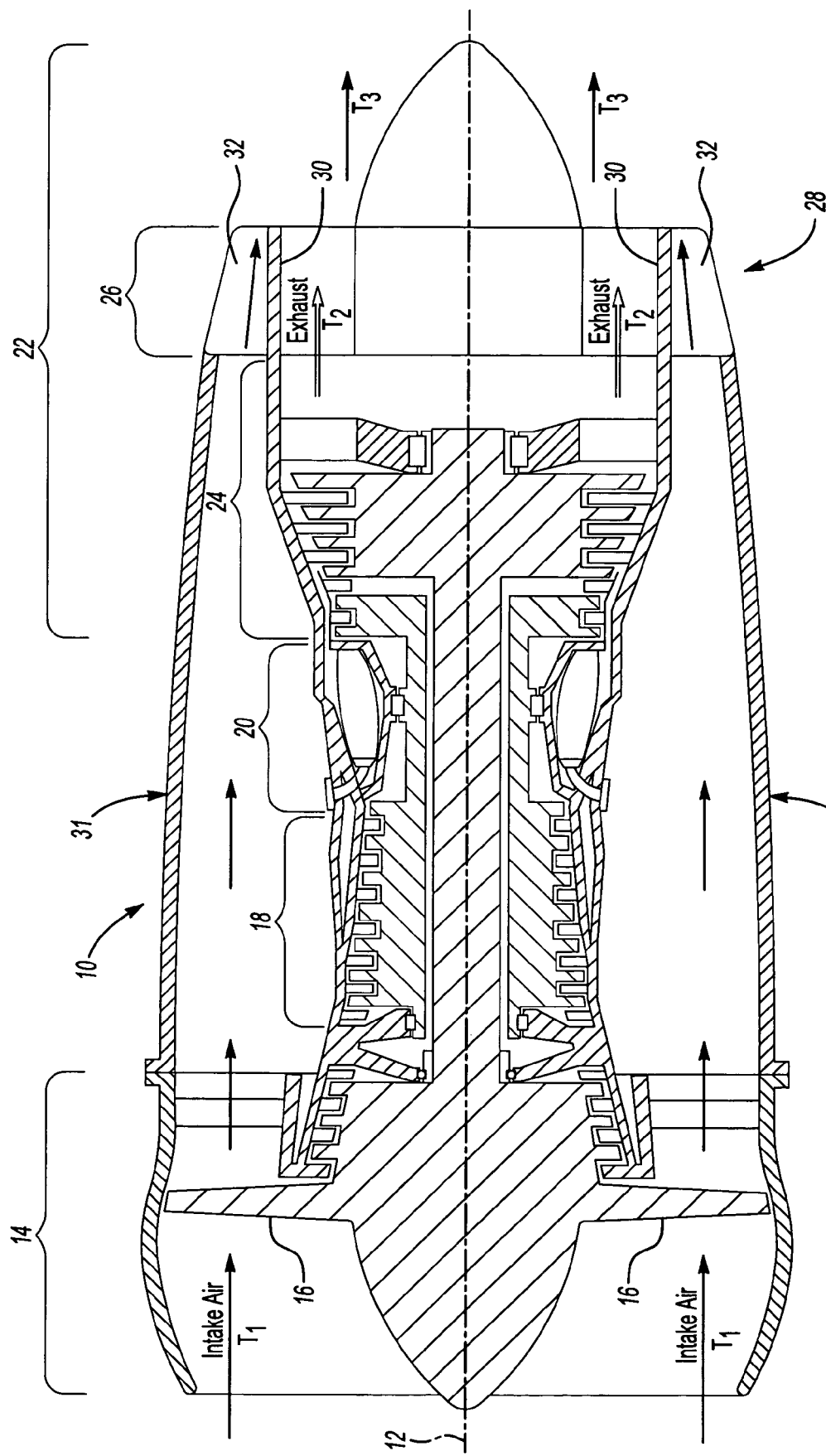
FIG. 1 is a schematic illustration of an example gas turbine engine.

FIG. 1 is a schematic illustration of an example gas turbine engine 10 circumferentially disposed about an engine centerline, or axial centerline axis 12. The example gas turbine engine 10 includes an intake section 14 including a fan 16, a compressor section 18, a combustor section 20, and a tail section 22 including a turbine assembly 24 and a mixer section 26. As is known, intake air enters the engine 10 through the intake section 14 and the fan 16 delivers the intake air to the compressor section 18 and the mixer section 26. This illustration shows one general engine type schematically. However, this invention would extend to any engine for any application.

The portion of the intake air that is delivered to the compressor section 18 is compressed. The compressed air is mixed with fuel that is burned in the combustor section 20 and expanded in the turbine assembly 24. The by-products of the combustion process exit the engine 10 through the tail section 22 at an elevated temperature as exhaust.

The mixer section 26 includes a mixer assembly 28 including a mixer element 30 and a plurality of scoops 32 attached around a circumference of the mixer element 30. The portion of the intake air delivered to the mixer section 26 by the fan 16 is at a lower temperature than the exhaust. The lower temperature intake air is delivered from the fan 16 to the plurality of scoops 32 through a series of ducts 31. The lower temperature intake air mixes with the exhaust within the mixer section 26 to reduce the temperature of the exhaust exiting the engine 10.

Figure 2:
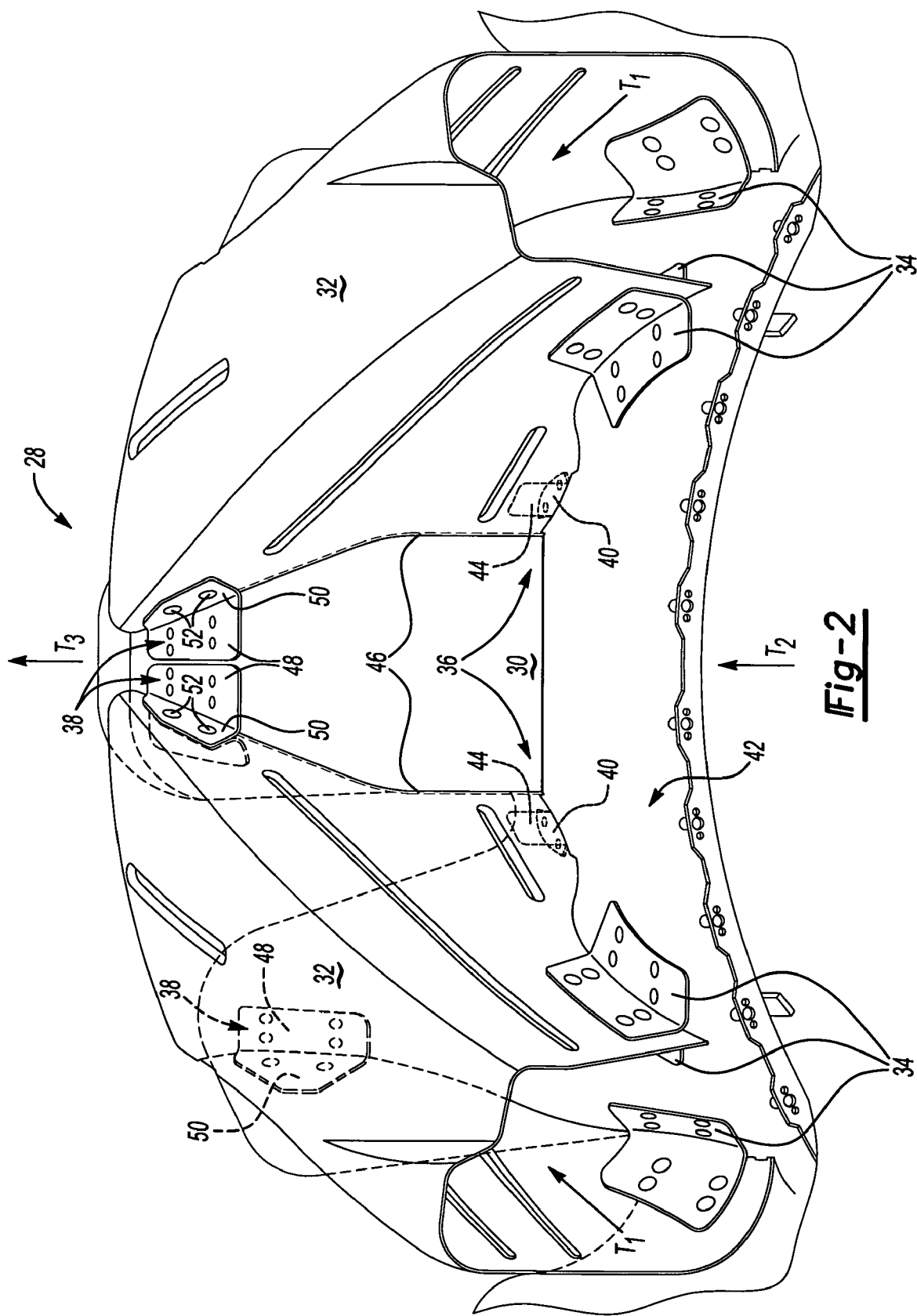
FIG. 2 is a sectional view of an example mixer assembly according to one embodiment of the present invention.

FIG. 2 is a sectional view of the mixer assembly 28 including the mixer element 30 and the plurality of scoops 32 attached to the mixer element 30 via fixed brackets 34, first sliding brackets 36, and second sliding brackets 38. Intake air at a first temperature $T_1$ is delivered from the fan 16 (FIG. 1) into the plurality of scoops 32. Exhaust at a second temperature $T_2$ flows from the combustion section 20 (FIG. 1) into the mixer element 30. Exhaust and intake air mix within the mixer element 30 and exit the mixer element 30 at a third temperature $T_3$. The first temperature $T_1$ is less than the second temperature $T_2$. The third temperature $T_3$ is greater than the first temperature $T_1$ and less than the second temperature $T_2$.

As can be appreciated from FIG. 2, the scoops 32 are attached to the outer circumference of the mixer element 30 at each of two circumferential ends 200 and 201. Thus, a duct is formed between an inner wall of the scoop 32, and the outer circumference of the mixer element 42. As can also be appreciated from these Figures, the brackets 34 may be positioned against an inner surface of the scoop, or an outer circumferential surface of the scoop. Air within the duct formed by the scoop enters an inlet end from the duct 31, and exits at the end of the mixer element to intermix with the exhaust air, as described above.

Figure 3A:
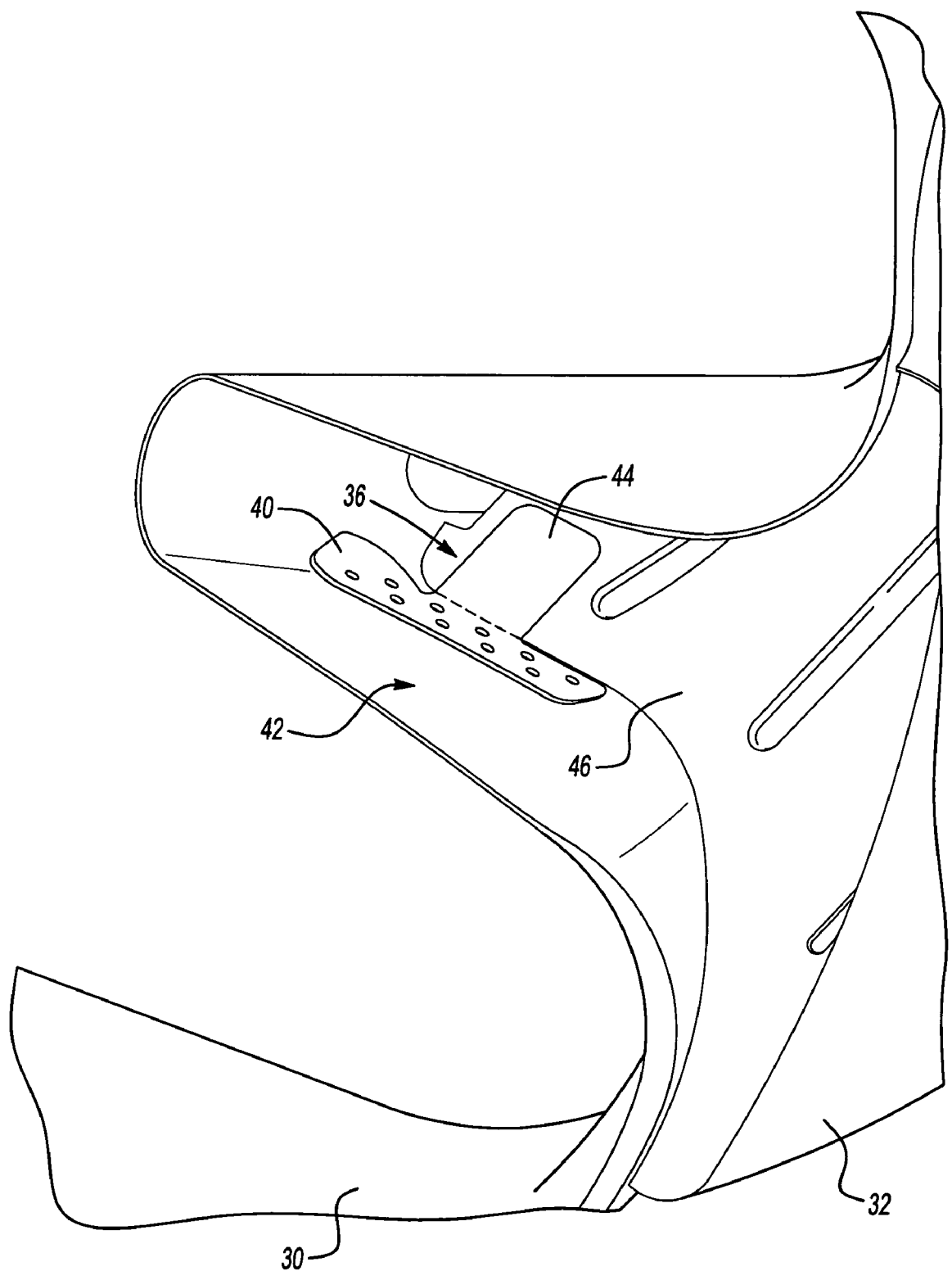
FIG. 3A is a detailed view of a first sliding bracket according to one embodiment of the present invention wherein the mixer element is in a first position relative to a scoop.
Figure 3B:
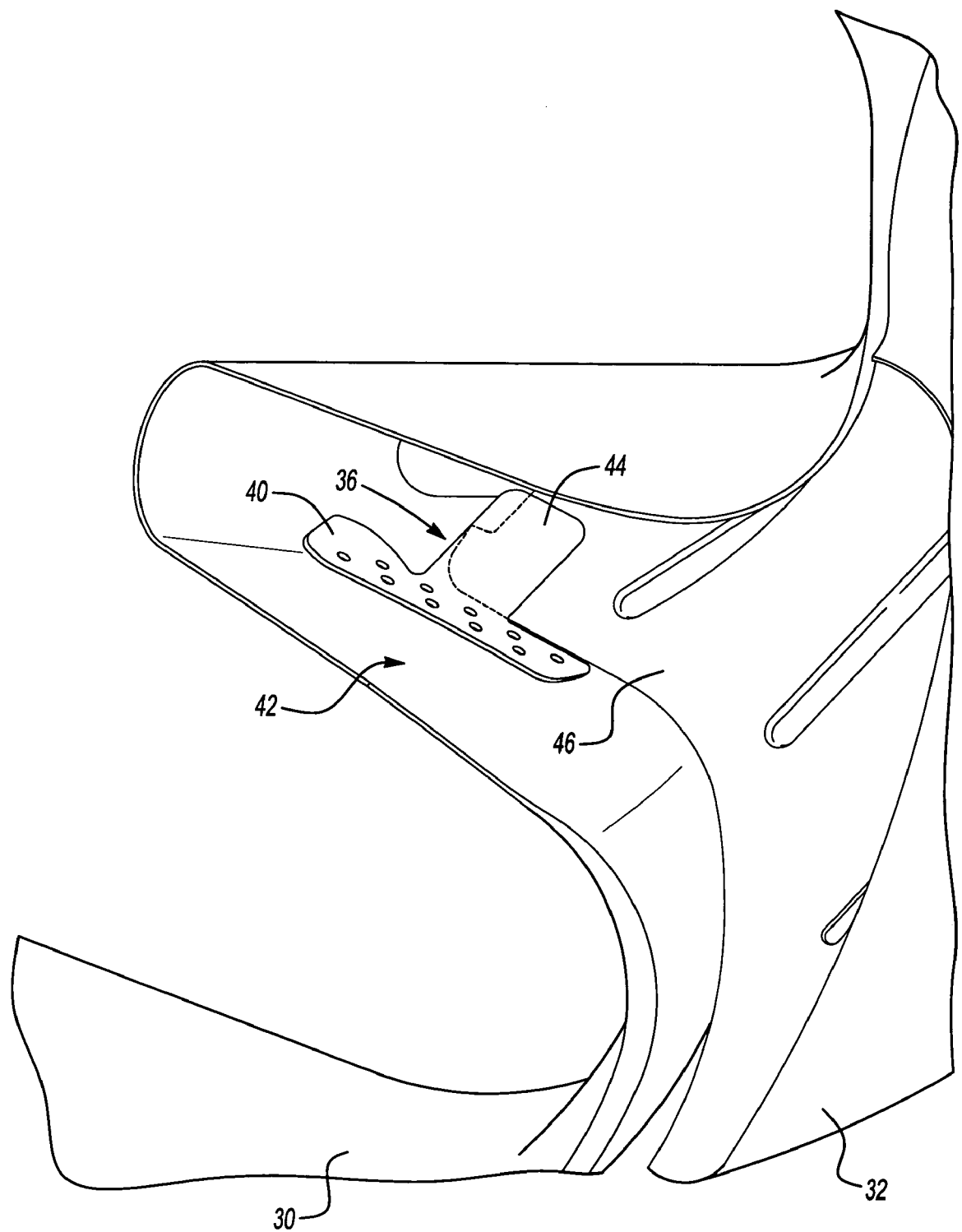
FIG. 3B is a detailed view of the first sliding bracket according to one embodiment of the present invention wherein the mixer element is in a second position relative to the scoop.

The first sliding bracket 36 includes a first flange 40 that is fixedly mounted to an outer circumference 42 of the mixer element 30 and a second flange 44 that is biased against an inner surface 46 of the scoop 32, as is shown in more detail in FIGS. 3A and 3B.

Figure 4A:
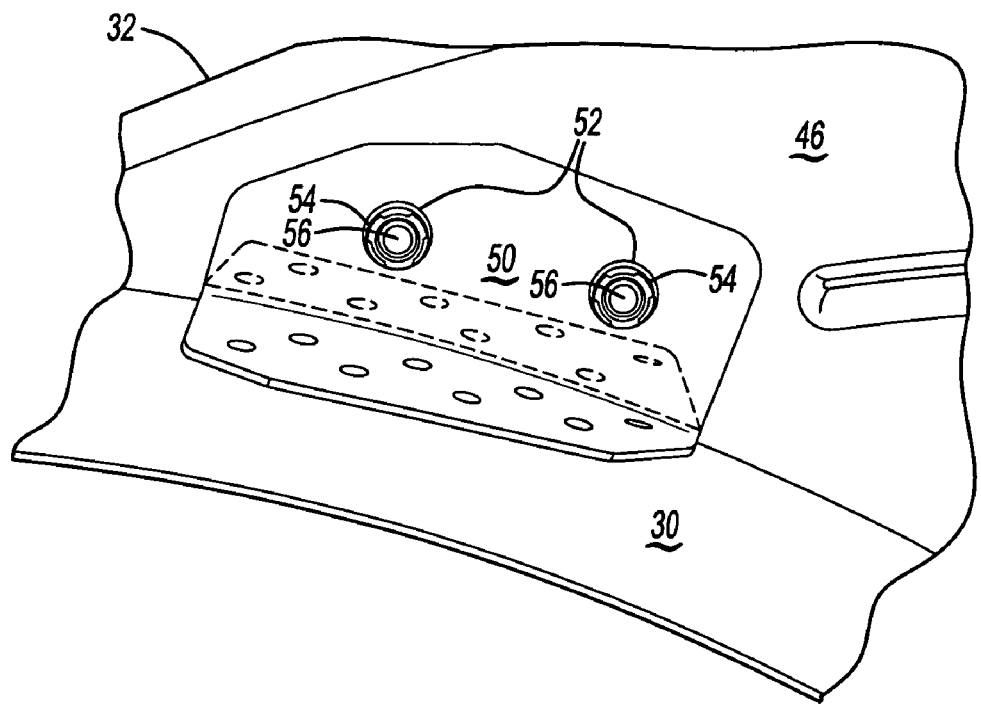
FIG. 4A is a detailed view of the scoop sandwiched between two second sliding brackets according to one embodiment of the present invention.
Figure 4B:
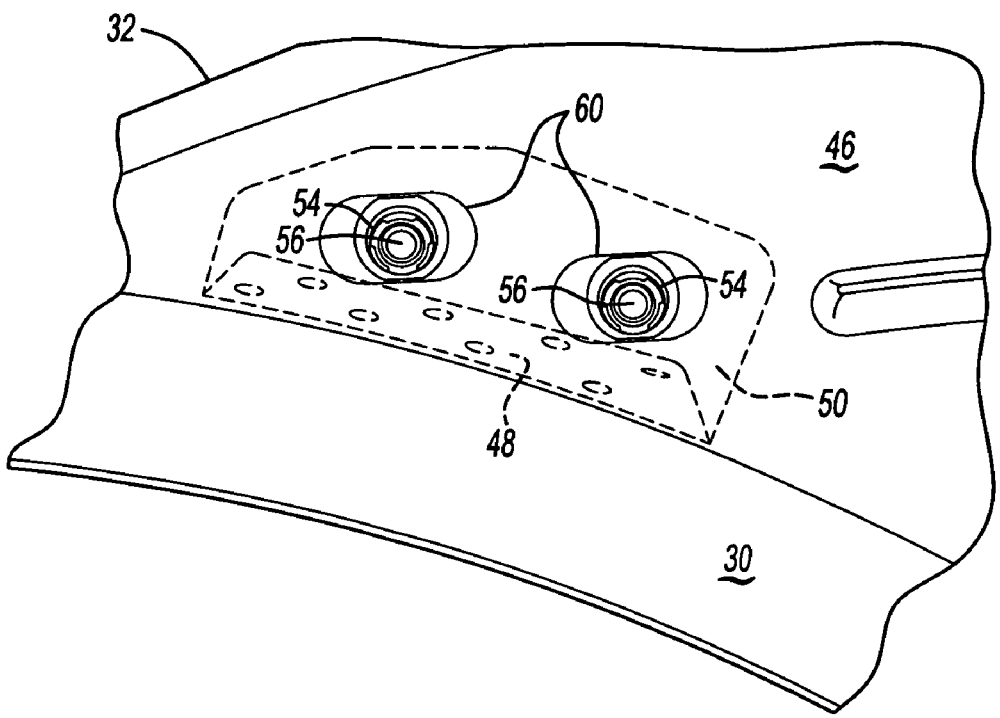
FIG. 4B is a detailed view of the scoop and one second bracket according to one embodiment of the present invention.
Figure 5:
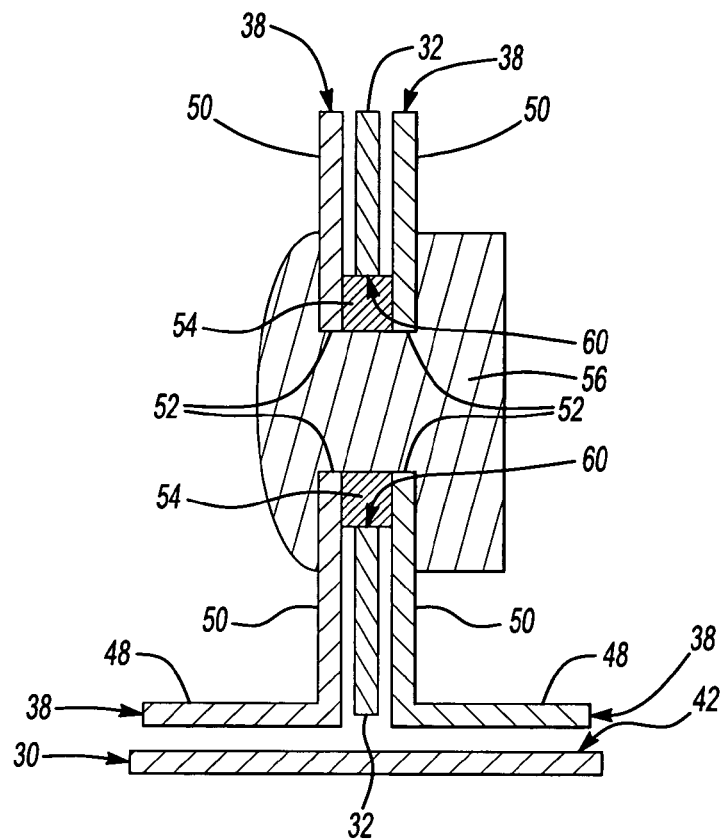
FIG. 5 is a detailed cross-section of a spacer and fastener assembly for attaching the second sliding bracket according to one embodiment of the present invention.

The second sliding bracket 38 includes a first flange 48 fixedly mounted to the outer circumference 42 of the mixer element 30 and a second flange 50 that is adjustably mounted to the inner surface 46 of the scoop 32, as is shown in more detail in FIGS. 4A, 4B and 5.

FIG. 3A is a detailed view of the first sliding bracket 36 fixedly mounted to the outer circumference 42 of the mixer element 30 and biased against the inner surface 46 of the scoop 32, wherein the mixer element 30 is in a first position in relation to the scoop 32. The first flange 40 of the first sliding bracket 36 extends inward from the inner surface 46 of the scoop 32 and is fixedly mounted to the mixer element 30 by conventional means. The second flange 44 extends upward from the outer circumference 42 of the mixer element 30. The second flange 44 is a resilient member (a spring finger) that is biased away from a relaxed position by the inner surface 46 of the scoop 32 and, thus held against the inner surface 46 of the scoop 32 by a resultant spring force.

During engine operation the mixer element 30 expands as the hot exhaust travels through it, while the scoop 32 stays relatively stable as the cooler intake air travels through it. To accommodate for the expansion of the mixer element 30, the second flange 44 of the first sliding bracket 36, which is fixedly attached to the mixer element 30 and only biased against the inner surface 46 of the scoop 32, allows the mixer element 30 to move to a second position (FIG. 3B) in relation to the scoop 32 as the mixer element 30 expands and contracts during normal engine operation.

FIG. 3B is a detailed view of the first sliding bracket 36 fixedly mounted to the outer circumference 42 of the mixer element 30 and biased against the inner surface 46 of the scoop 32, wherein the scoop 32 is in a second position.

FIGS. 4A and 4B are detailed views of the second sliding bracket 38 fixedly mounted to the mixer element 30 and adjustably mounted to the inner surface 46 of the scoop 32. As illustrated in FIG. 4A, a first flange 48 of the second sliding bracket 38 is fixedly mounted to the mixer element 30 by conventional means. A second flange 50 of the second sliding bracket 38 includes attachment holes 52 through which spacers 54 and fastener assemblies 56 are received.

As illustrated in FIG. 4B, the scoop 32 includes slots 60 through which the spacers 54 and the fastener assemblies 56 are received.

As illustrated in FIG. 5, the scoop 32 is sandwiched between two second sliding brackets 38, which are mounted to the outer circumference 42 of the mixer element 30 by conventional means. Spacer 54 is disposed within the slot 60 in the scoop 32. Fastener assembly 56 is received within the attachment holes 52 disposed within the second flange 50 of each of the second sliding brackets 38. The spacer 54 maintains clearance between the fastener assembly 56 and the slot 60 (FIGS. 6A and 6B) disposed in the scoop 32 and applies an initial load to the fastener assembly 56. The spacer 54 and fastener assembly 56 are moveable within the slot 60 as further illustrated in FIGS. 6A and 6B.

During engine operation the mixer element 30 expands as the hot exhaust travels through it while the scoop 32 stays relatively stable as the cooler intake air travels through it. To further accommodate for the expansion of the mixer element 30, the second sliding brackets 38, which are fixedly attached to the mixer element 30, are also adjustably attached to the scoop 32 by allowing the mixer element 30 to move in relation to the scoop 32 as the mixer element 30 expands and contracts during normal engine operation. This is accomplished when the fastener assembly 56 and spacer 54 to slide within the slot 60 as is further illustrated in FIGS. 6A and 6B.

Figure 6A:
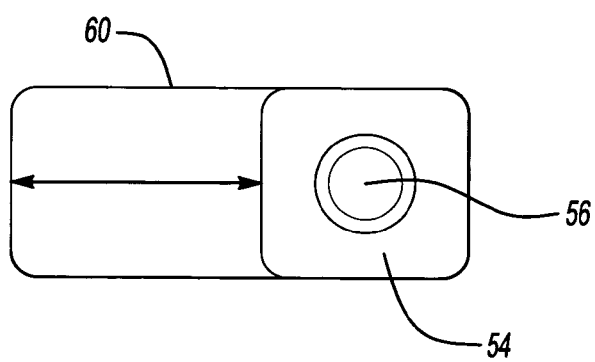
FIG. 6A is a detailed view of the spacer and fastener assembly disposed in a slot of the scoop in a first position according to one embodiment of the present invention.
Figure 6B:
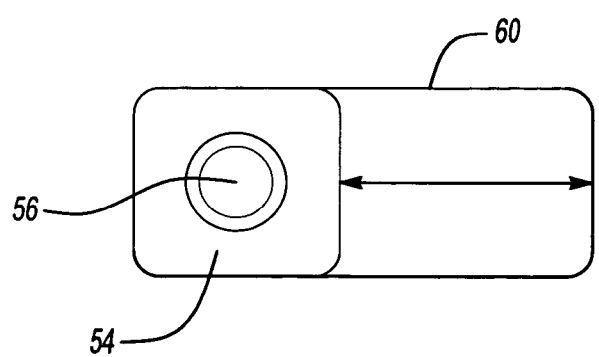
FIG. 6B is a detailed view of the spacer and fastener assembly disposed in the slot of the scoop in a second position according to one embodiment of the present invention.

As illustrated in FIGS. 6A and 6B, the spacer 54 and fastener assembly 56 can slide within slot 60 to accommodate the relative movement of the mixer element 30 in relation to the scoop 32, effectively thermally decoupling the mixer element 30 from the scoop 32.

Although preferred embodiments of this invention have been disclosed, a worker of ordinary skill in this art would recognize that certain modifications would come within the scope of this invention. For that reason, the following claims should be studied to determine the true scope and content of this invention.

What is claimed is:

1. A mixer assembly for a gas turbine engine comprising:
a mixer element;
at least one scoop attached to an outer circumference of the mixer element, a duct formed between an inner surface of said at least one scoop and said outer circumference of the mixer element, wherein the duct receives intake air from a fan in the gas turbine engine; and
at least one sliding bracket attaching the mixer element and the at least one scoop, wherein the at least one sliding bracket is fixedly mounted to one of the scoop and the mixer element and moveable in relation to the other of the scoop and the mixer element.

2. The mixer assembly as recited in claim 1, wherein the at least one sliding bracket includes a first flange that is fixedly mounted to the mixer element and a second flange that is biased against a surface of the scoop.

3. The mixer assembly as recited in claim 2, wherein the first flange and the second flange are substantially perpendicular to one another.

4. The mixer assembly as recited in claim 1, wherein the at least one sliding bracket includes a first flange that is fixedly mounted to the mixer element and a second flange is adjustably mounted to the scoop.

5. The mixer assembly as recited in claim 4, further including a fastener assembly fastening the at least one scoop to the mixer element, wherein the second flange includes at least one attachment hole, the scoop includes at least one attachment slot, and the fastener assembly is received within the at least one attachment hole and the at least one attachment slot.

6. The mixer assembly as recited in claim 5, wherein the fastener assembly includes a spacer.

7. The mixer assembly as recited in claim 1, wherein the at least one sliding bracket includes a first sliding bracket and a second sliding bracket, the first sliding bracket fixedly mounted to the mixer element and biased against a surface of the at least one scoop and the second sliding bracket fixedly mounted to the mixer element and adjustably mounted to the at least one scoop.

8. The mixer assembly as recited in claim 7, further including at least one fixed bracket fixedly mounted to the mixer element and fixedly mounted to the at least one scoop.

9. A mixer assembly for a gas turbine engine comprising:
a mixer element;
a plurality of scoops attached to an outer circumference of the mixer element, a plurality of ducts formed between an inner surface of said plurality of scoops and said outer circumference of the mixer element, wherein the plurality of ducts receives intake air from a fan in the gas turbine engine; and
at least one sliding bracket providing attachment between the mixer element and one of the plurality of scoops, wherein the at least one sliding bracket is fixedly mounted to the mixer element and moveable in relation to the one scoop.

10. The mixer assembly as recited in claim 9, wherein the at least one sliding bracket includes:
a first sliding bracket having a first flange fixedly mounted to the mixer element and a second flange biased against a surface of the scoop; and
a second sliding bracket having a first flange fixedly mounted to the mixer element and a second flange adjustably mounted to the scoop.

11. The mixer assembly as recited in claim 9, further including at least one fixed bracket fixedly mounted to the mixer element and fixedly mounted to the scoop.

12. A gas turbine engine comprising:
a intake for receiving intake air, wherein the intake includes a fan for delivering a portion of the intake air to a mixer assembly that mixes the portion of intake air with exhaust;
a compressor for compressing another portion of the intake air;
a combustor for combusting the another portion of intake air with fuel to form exhaust; and
a tail section including a turbine assembly and the mixer assembly, wherein the mixer assembly includes:
a mixer element;
a plurality of scoops attached around an outer circumference of the mixer element, wherein the portion of the intake air is delivered to the plurality of scoops, a plurality of ducts formed between an inner surface of said plurality of scoops and said outer circumference of the mixer element;
at least one sliding bracket providing attachment between the mixer element and at least one of the plurality of scoops, wherein the at least one sliding bracket is fixedly mounted to the mixer element and moveable in relation to at least one of the plurality of scoops.

13. The gas turbine engine as recited in claim 12, wherein the at least one sliding bracket includes a first sliding bracket fixedly mounted to the mixer element and biased against a surface of at least one of the plurality of scoops and a second sliding bracket fixedly mounted to the mixer element and adjustably mounted to the at least one of the plurality of scoops.

14. The gas turbine engine as recited in claim 13, further including at least one fixed bracket fixedly mounted to the mixer element and fixedly mounted to the at least one of the plurality of scoops.

15. The mixer assembly as recited in claim 1, wherein said scoop is attached to said outer circumference of the mixer element at each of a pair of spaced circumferential edges to define said duct.

16. The mixer assembly as recited in claim 9, wherein said scoop is attached to said outer circumference of the mixer element at each of a pair of spaced circumferential edges to define said duct.

17. The gas turbine engine as recited in claim 12, wherein said scoop is attached to said outer circumference of the mixer element at each of a pair of spaced circumferential edges to define said duct.

18. The mixer assembly as recited in claim 1, wherein there are a plurality of sliding brackets, with at least one bracket contacting said inner surface of said at least one scoop, and at least one other bracket contacting an outer surface.

19. The mixer assembly as recited in claim 9, wherein there are a plurality of sliding brackets, with at least one bracket contacting said inner surface of said at least one scoop, and at least one other bracket contacting an outer surface.

20. The gas turbine engine as recited in claim 12, wherein there are a plurality of sliding brackets, with at least one bracket contacting said inner surface of said at least one scoop, and at least one other bracket contacting an outer surface.

* * * * *